United States Patent
Olshansky et al.

(10) Patent No.: US 6,633,572 B1
(45) Date of Patent: *Oct. 14, 2003

(54) ETHERNET TO ADSL ADAPTER

(75) Inventors: Robert Olshansky, Wayland, MA (US); Shuang Deng, Sudbury, MA (US); Alan R. Bugos, Waltham, MA (US)

(73) Assignee: Verizon Laboratories Inc., Waltham, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/507,197

(22) Filed: Feb. 18, 2000

Related U.S. Application Data

(63) Continuation of application No. 08/796,771, filed on Feb. 6, 1997, now Pat. No. 6,061,357.

(51) Int. Cl.$^7$ ............................ H04L 12/56; H04L 12/50
(52) U.S. Cl. ........................ 370/401; 370/229; 370/335; 370/389; 370/400; 370/412; 370/419; 370/466; 370/910
(58) Field of Search ................................ 370/229, 235, 370/236, 389, 400, 401, 412, 413, 414, 419, 466, 908, 910, 911, 912, 445, 447, 448, 461, 462, 463; 710/29, 52, 57

(56) References Cited

U.S. PATENT DOCUMENTS

| | | | |
|---|---|---|---|
| 5,568,476 A | * 10/1996 | Sherer et al. | 370/60 |
| 5,790,548 A | 8/1998 | Sistanizadeh et al. | 370/401 |
| 5,796,738 A | 8/1998 | Scott et al. | 370/401 |
| 5,812,786 A | * 9/1998 | Seazholtz et al. | 395/200.63 |
| 5,815,505 A | 9/1998 | Mills | 370/522 |
| 5,878,047 A | 3/1999 | Ganek et al. | 370/486 |
| 5,883,941 A | 3/1999 | Akers | 370/468 |
| 5,936,963 A | * 8/1999 | Saussy | 370/447 |
| 5,940,597 A | * 8/1999 | Chung | 395/200.72 |
| 6,061,357 A | * 5/2000 | Olshansky et al. | 370/401 |
| 6,256,313 B1 | * 7/2001 | Chung | 370/401 |

OTHER PUBLICATIONS

Robert Olshansky, Moving Toward Low–Cost Access to the Information Highway, Telephony, Nov. 7, 1994, pp. 31–37.
Westell Technologies, World Vision ADSL Asymmetric Digital Subscriber Line, 1996, 37 pages.

* cited by examiner

*Primary Examiner*—Hassan Kizou
*Assistant Examiner*—Joe Logsdon
(74) *Attorney, Agent, or Firm*—Leonard Charles Suchyta; James K. Weixel

(57) ABSTRACT

An Ethernet ADSL adapter controls data communication between an Ethernet port and an ADSL modem connected to an ADSL channel. The adapter includes a first buffer for storing data packets received at the Ethernet port, a second buffer for storing data packets received from the ADSL modem and a controller. When the first buffer contains a first predetermined number of data packets and data packets are not available for transmission to the Ethernet port, a jamming signal is transmitted from the Ethernet port. The jamming signal inhibits transmission of additional data packets to the Ethernet port by other Ethernet nodes until space is available in the first buffer. When the second buffer contains a second predetermined number of data packets, a pause signal is transmitted to the ADSL modem. The pause signal inhibits further transmission of data packets to the ADSL modem on the ADSL channel until space is available in the second+ buffer. When a pause signal is received from the ADSL modem, transmission of data packets to the ADSL modem is inhibited.

10 Claims, 7 Drawing Sheets

ETHERNET TO ADSL ADAPTER

This is a Continuation of application Ser. No. 08/796,771, filed Feb 6, 1997, now U.S. Pat. No. 6,061,357.

FILED OF THE INVENTION

This invention relates to transmission of data using an asymmetric digital subscriber line (ADSL) channel and, more particularly, to methods and apparatus for transmitting data to and between an ADSL channel and an Ethernet network.

BACKGROUND OF THE INVENTION

The rapid growth of the "information highway" has created the need for high-speed, low-cost techniques for transmitting data to and from homes, small businesses, schools and the like. At the data rates of conventional modems, the transmission of detailed graphics, for example, typically requires a time that may be annoying to the user. A web page containing detailed graphics of 100 kilobytes may require 27 seconds for transmission. Optical fiber networks and CATV networks have sufficient bandwidth to permit high speed data transmission. However, the infrastructure is not presently available to provide data services to consumers on optical fiber or CATV networks on a widespread basis and at low cost.

An ADSL standard for data transmission is being developed to address these issues. Data transmission, according to the ADSL standard, permits transmission of simplex and duplex digital data signals over the conventional twisted wire pairs that are used for plain old telephone service (POTS). The digital data signals are transmitted at frequencies above the baseband analog POTS band (0–4 kilohertz). The ADSL standard is a physical layer standard providing for a simplex downstream channel at a maximum rate of 6.2 megabits per second and a minimum rate of 1.544 megabits per second. The ADSL standard also includes a duplex digital channel at optional rates of 64 kilobits per second, 160 kilobits per second, 384 kilobits per second and 576 kilobits per second. The ADSL standard takes advantage of the fact that most consumer applications, such as Internet access, access to online information services, access to private networks and work-at-home applications, require a larger bandwidth into the home than out of the home. ADSL transport technology is described by R. Olshansky in "Moving Toward Low-Cost Access to the Information Highway", Telephony, Nov. 7, 1994, pp. 31–37.

The basic ADSL architecture includes an ADSL interface unit at the telephone company central office and an ADSL interface at the customer location, interconnected by a twisted pair of conductors. Each ADSL interface unit includes a POTS splitter and an ADSL modem. The ADSL modem transmits and receives digital data on the twisted pair at the selected ADSL transmission rates. At the central office, the ADSL interface unit receives and transmits digital data from a packet switch. The POTS splitter frequency multiplexes the high speed digital data and the analog POTS signal onto the twisted pair for transmission. The POTS splitter at the customer location decouples the analog POTS signal onto the existing POTS wiring in the home. The ADSL modem adapts the ADSL data signals to the conventional 10 Base T Ethernet format and delivers them over 10 Base T wiring to the customer's PC or Ethernet LAN. The interface between the Ethernet network and the ADSL modem must be configured to ensure a smooth and efficient transfer of digital data.

SUMMARY OF THE INVENTION

According to a first aspect of the invention, an Ethernet to ADSL adapter is provided for controlling data communication between an Ethernet port and an ADSL modem connected to an ADSL channel. The adapter comprises a first buffer for storing data packets received at the Ethernet port, means for transmitting the data packets from the first buffer to the ADSL modem at a first ADSL transmission rate and means for transmitting data packets received from the ADSL modem to the Ethernet port at a second ADSL transmission rate. The adapter further comprises means for transmitting a jamming signal from the Ethernet port when the first buffer contains a first predetermined number of data packets and data packets are not available for transmission to the Ethernet port. Transmission of additional data packets to the Ethernet port by other Ethernet nodes is inhibited by the jamming signal.

Preferably, the adapter includes means for inhibiting transmission of data packets to the ADSL modem when a first pause signal is received from the ADSL modem. The adapter may include means for resuming transmission of data packets to the ADSL modem in response a resume signal received from the ADSL modem following receipt of the first pause signal. The adapter may further include a timer for generating a timeout signal in response to the first pause signal, the timing signal representing a timeout period, and means responsive to the timeout signal for resuming transmission of data packets to the ADSL modem following the timeout period.

In a preferred embodiment, the adapter further includes a second buffer for storing the data packets received from the ADSL modem, wherein data packets are transmitted to the Ethernet port from the second buffer, and means for transmitting a second pause signal to the ADSL modem when the second buffer contains a second predetermined number of data packets. Transmission of additional data packets to the adapter from the ADSL modem is inhibited by the second pause signal. The adapter may further include means for transmitting a resume signal to the ADSL modem following transmission of the second pause signal when the second buffer contains less than the second predetermined number of data packets.

The data packets may be transmitted to the Ethernet port using binary back-off when the occupancy of the second buffer is below a threshold. The data packets may be transmitted to the Ethernet port using zero back-off when the occupancy of the second buffer is at or above the threshold.

According to another aspect of the invention, an Ethernet to ADSL adapter is provided for controlling data communication between and Ethernet port and an ADSL modem connected to an ADSL channel. The adapter comprises means for transmitting data packets received at the Ethernet port to the ADSL modem at a first ADSL transmission rate, a buffer for storing data packets received from the ADSL modem at a second ADSL transmission rate and means for transmitting the data packets from the buffer to the Ethernet port. The adapter further comprises means for transmitting a pause signal to the ADSL modem when the buffer contains a predetermined number of data packets. Transmission of additional data packets to the adapter from the ADSL modem is inhibited by the pause signal.

According to a further aspect of the invention, a method is provided for controlling data communication between an Ethernet port and an ADSL modem connected to an ADSL channel. Data packets received at the Ethernet port are stored in a first buffer, and the data packets are transmitted from the first buffer to the ADSL modem at a first ADSL transmission rate. Data packets received from the ADSL modem at a second ADSL transmission rate are transmitted to the Ethernet port. A jamming signal is transmitted from the Ethernet port when the first buffer contains a first predetermined number of data packets and data packets are not available for transmission to the Ethernet port. Transmission of additional data packets to the Ethernet port by other Ethernet nodes is inhibited by the jamming signal.

According to yet another aspect of the invention, a method is provided for controlling data communication between an Ethernet port and an ADSL modem connected to an ADSL channel. Data packets received at the Ethernet port are transmitted to the ADSL modem at a first ADSL transmission rate. Data packets received from the ADSL modem at a second ADSL transmission rate are stored in a buffer, and the data packets are transmitted from the buffer to the Ethernet port. A pause signal is transmitted to the ADSL modem when the buffer contains a predetermined number of data packets. Transmission of additional data packets to the adapter from the ADSL modem is inhibited by the pause signal.

BRIEF DESCRIPTION OF THE DRAWINGS

For a better understanding of the present invention, reference is made to the accompanying drawings, which are incorporated herein by reference and in which.

DETAILED DESCRIPTION

Figure 1:
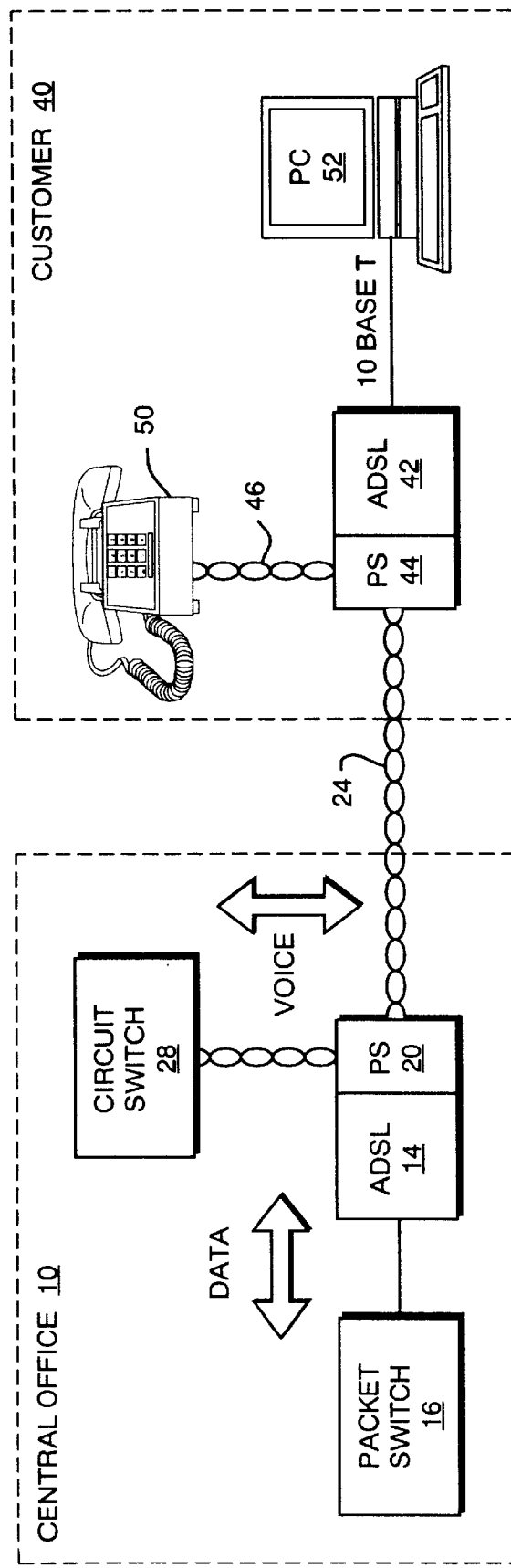
FIG. 1 is a block diagram of a basic ADSL architecture.

A block diagram of a basic ADSL architecture is shown in FIG. 1. At a central office 10, an ADSL interface unit 14 receives and transmits digital data from a packet switch 16. The ADSL interface unit 14 includes a POTS splitter 20 which frequency multiplexes the digital data onto a twisted pair 24 for transmission outside central office 10 to a customer location 40. The POTS splitter 20 couples the analog POTS signal to a circuit switch 28 which controls POTS service. The ADSL interface unit 14 further includes an ADSL modem which transmits data packets to customer location 40 on twisted pair 24 at a selected downstream ADSL transmission rate and which receives data packets transmitted from the customer location 40 on twisted pair 24 at a selected upstream ADSL transmission rate. Where the packet switch 16 is an Ethernet switch, the ADSL interface unit 14 also includes an Ethernet to ADSL adapter as described below.

Twisted pair 24 connects to customer location 40 having an ADSL interface unit 42. The ADSL interface unit 42 contains a POTS splitter 44 which decouples the analog POTS signal onto the POTS wiring 46 in the home for connection to a customer telephone handset 50 or other telephone equipment. The ADSL interface unit 42 further includes an ADSL modem which converts the ADSL data signals to conventional 10 Base T Ethernet format and delivers the converted signals over 10 Base T wiring to a workstation or personal computer (PC) 52, or to an Ethernet local area network (LAN). The ADSL interface unit 42 further includes an Ethernet to ADSL adapter as described below.

Figure 2:
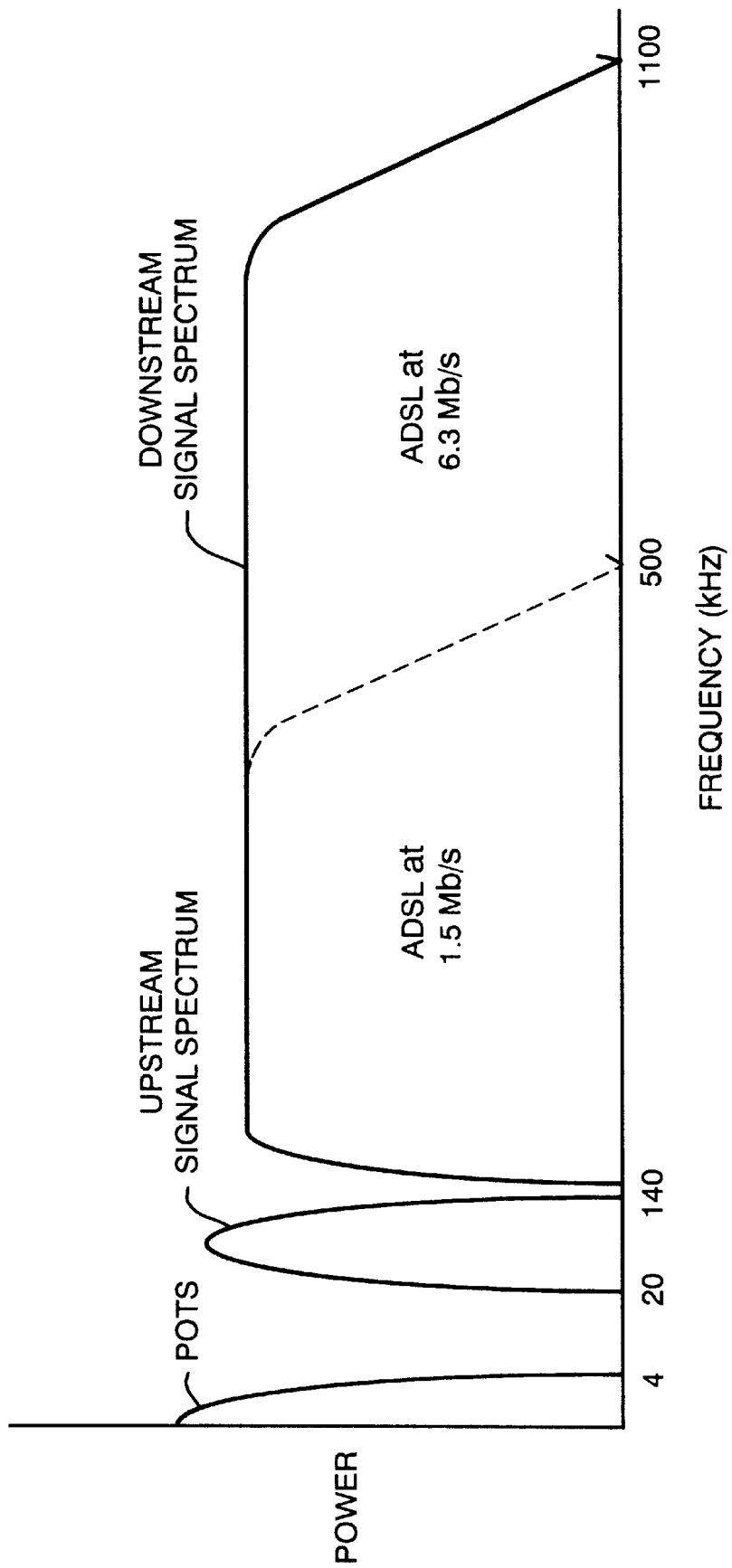
FIG. 2 is a graph of power as a function of frequency, illustrating the ADSL spectrum.

The ADSL standard for data transmission promulgated by ANSI (American National Standards Institute) provides for three simultaneous transport services on twisted pair copper loops as shown in FIG. 2. Basic analog telephone service occupies the zero kilohertz to four kilohertz band. A high speed simplex channel transmits data downstream from central office 10 to customer location 40 at data rates of 1.5 megabits per second to 6.2 megabits per second depending on the transmission characteristics of the copper loop and the service option selected by the subscriber. A duplex communication channel varies from 160 kilobits per second to 576 kilobits per second, depending on the characteristics of the loop and the service option selected by the subscriber.

Figure 3:
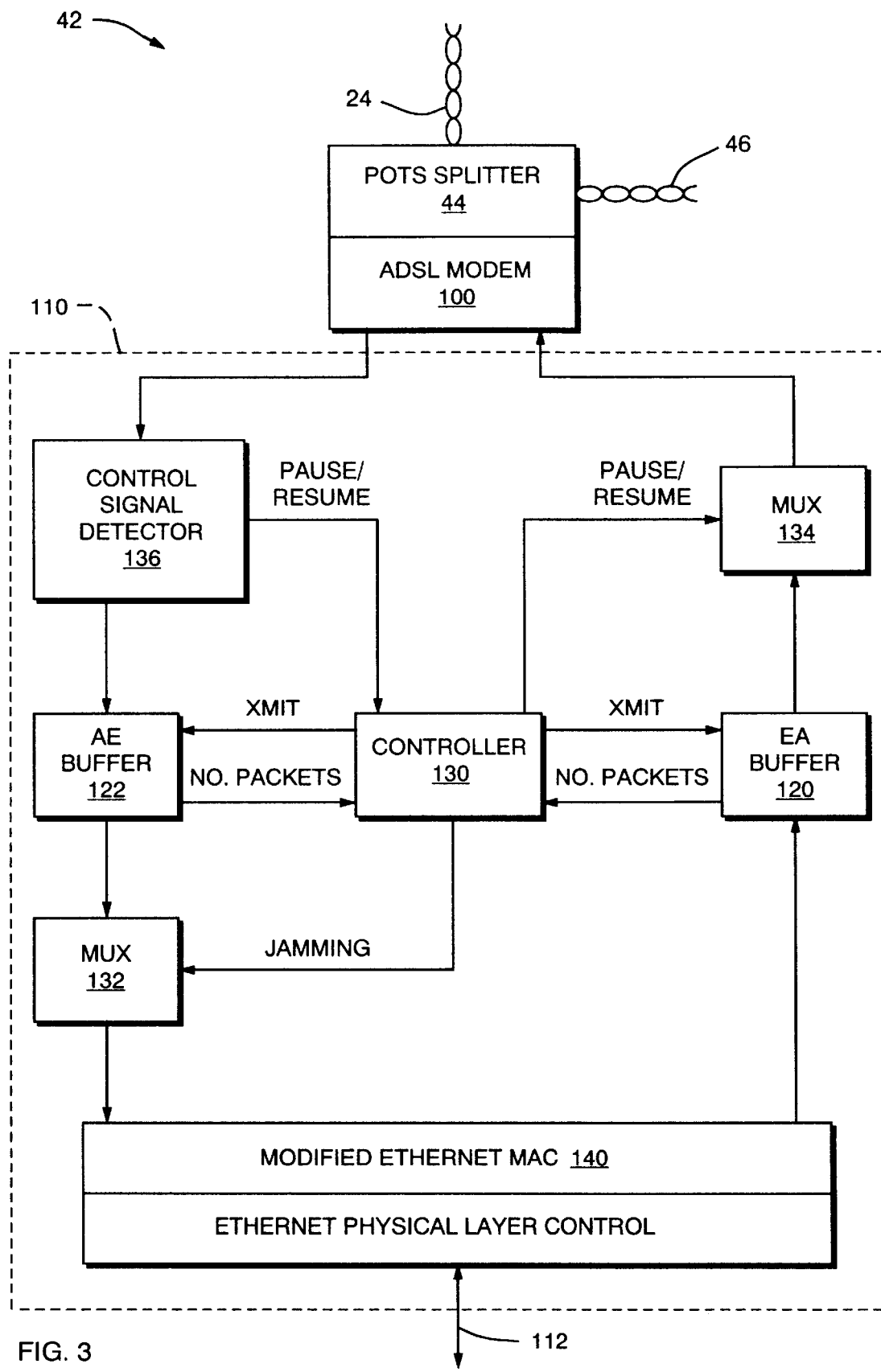
FIG. 3 is a block diagram of an ADSL interface unit including an Ethernet to ADSL adapter in accordance with the invention.

A block diagram of the ADSL interface unit 42 is shown in FIG. 3. POTS splitter 44 decouples the analog POTS signal on twisted pair 24 onto POTS wiring 46. An ADSL modem 100 transmits and receives digital data packets on twisted pair 24 at the appropriate date rates and signal levels. Data packets to be transmitted on twisted pair 24 are received from an Ethernet to ADSL adapter 110, and data packets received on twisted pair 24 are supplied to Ethernet to ADSL adapter 110. The data packets are transmitted and received by Ethernet to ADSL adapter 110 through an Ethernet port 112 to a PC or LAN that has an Ethernet interface. Typically, the subscriber has a personal computer or workstation equipped with an Ethernet network interface card, an Ethernet LAN segment, an Ethernet hub, or a router with Ethernet ports. The adapter 110 may be built into the ADSL modem or may be a separate unit.

The adapter 110 includes an EA buffer 120 for temporarily storing data packets received at the Ethernet port 112 and an AE buffer 122 for temporarily storing data packets received from ADSL modem 100. A controller 130 controls operation of the Ethernet to ADSL adapter 110 as described below. A multiplexer 132 selects a data packet from AE buffer 122 or a jamming signal from controller 130 for transmission through Ethernet port 112. A multiplexer 134 selects a data packet from EA buffer 120 or a pause/resume signal from controller 130 for transmission to the ADSL modem 100. A control signal detector 136 detects control signals, which may be control data packets or control information data contained within data packets, for control of the Ethernet to ADSL adapter 110. The control signals are supplied by control signal detector 136 to controller 130. Data packets received from ADSL modem 100 which contain data to be transmitted through Ethernet post 112 are loaded into AE buffer 122. The controller 130 receives signals from EA buffer 120 and AE buffer 122 indicating the number of data packets in each buffer. The controller provides transmit control signals to each of the buffers 120 and 122. Further, the controller 130 provides a jamming signal and a select signal to multiplexer 132 and supplies a pause/resume signal and a select signal to multiplexer 134. The Ethernet to ADSL adapter 110 may be implemented, for example, with a commercially available switched Ethernet port controller, a microprocessor and other commercially available components for cost effectiveness.

Figure 4:
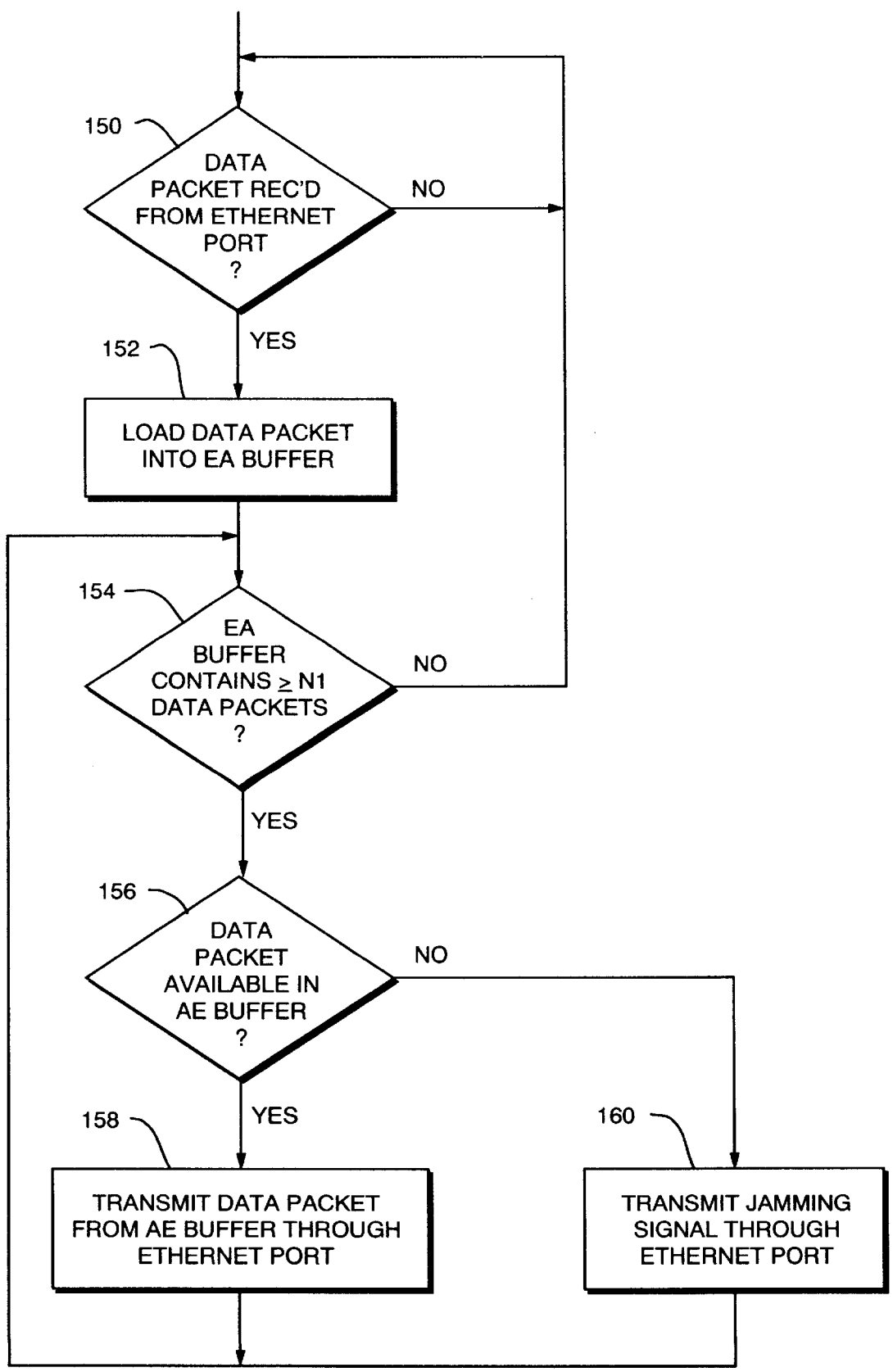
FIG. 4 is a flow diagram of the operations performed by the Ethernet to ADSL adapter in receiving data packets from the Ethernet port.
Figure 5:
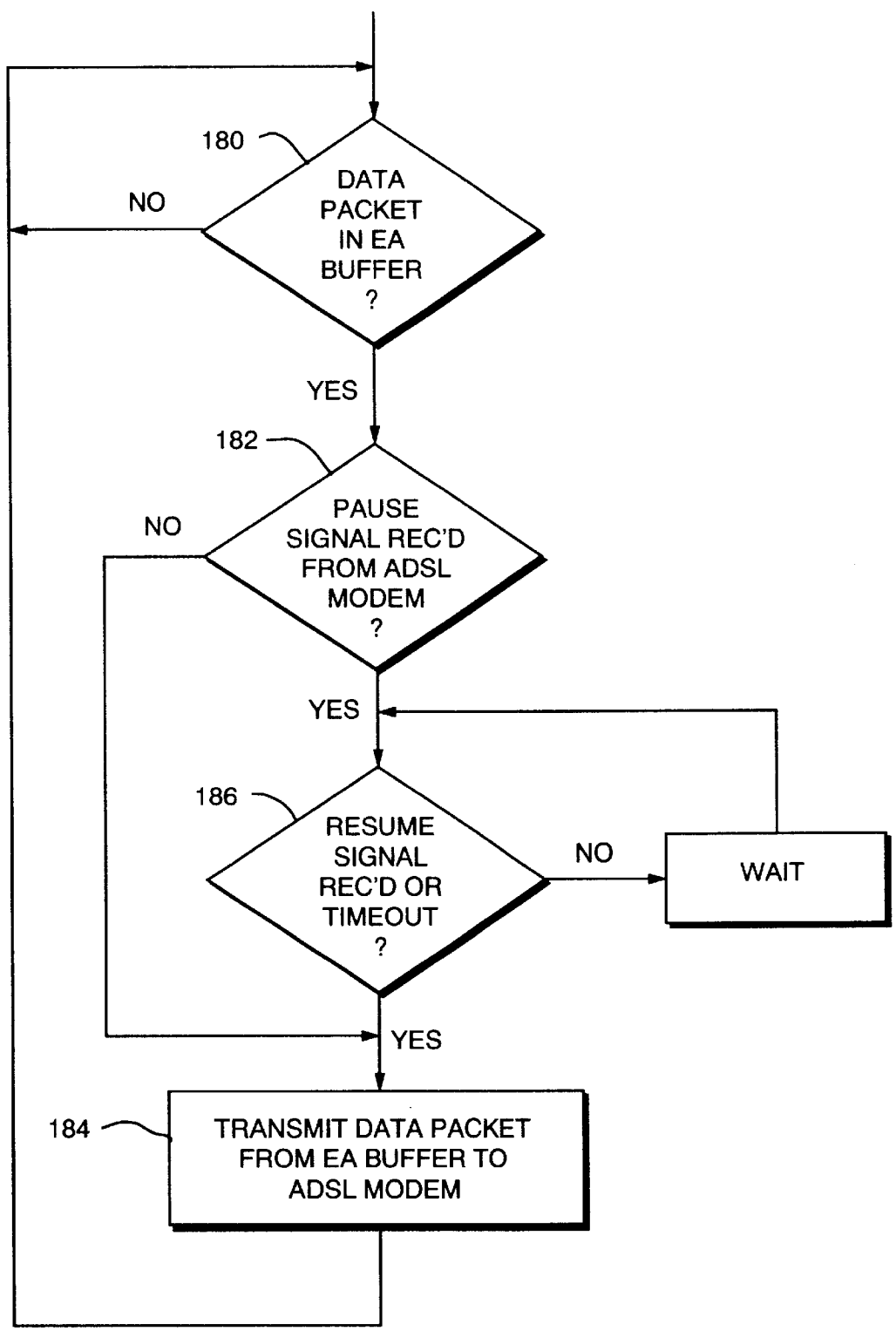
FIG. 5 is a flow diagram of the operations performed by the Ethernet to ADSL adapter in transmitting data packets to the ADSL modem.

A flow diagram of the operations performed by the Ethernet to ADSL adapter 110 in receiving data packets at the Ethernet port 112 is shown in FIG. 4. When a data packet is received through the Ethernet port 112, as determined in step 150, the data packet is loaded into EA buffer 120 in step 152. The number of data packets in EA buffer 120 is monitored by controller 130. In step 154, the number of data packets in EA buffer 120 is compared with a threshold number N1, which is selected to indicate that the EA buffer is full or nearly full. When the EA buffer contains less than the threshold number N1 of data packets, additional data packets may be loaded into the EA buffer 120, and data packets are transmitted to the ADSL modem, as shown in FIG. 5 and described below. When the number of data packets in EA buffer 120 is equal to or greater than the threshold number N1, the controller 130 determines in step 156 whether a data packet is available in AE buffer 122 for transmission through the Ethernet port 112. When a data packet is available in the AE buffer 122, the data packet is transmitted through the Ethernet port via multiplexer 132 in step 158. If a collision occurs during the transmission of the data packet, retransmission starts immediately without back-off, thereby preventing transmission from other Ethernet nodes. When a data packet is not available in the AE buffer 122, a jamming signal is transmitted through the Ethernet port 112 via multiplexer 132 in step 160. The jamming signal is transmitted continuously so as to prevent transmission from other Ethernet nodes, until the EA buffer 120 has sufficient space to receive additional data packets. The jamming signal prevents loss of data packets as a result of overloading EA buffer 120.

A flow diagram of the operations performed by the Ethernet to ADSL adapter 110 in transmitting data packets to the ADSL modem 100 is shown in FIG. 5. When the controller 130 determines in step 180 that a data packet is present in EA buffer 120, the controller next determines in step 182 whether a pause signal was received from the ADSL modem via control signal detector 136. When a pause signal has not been received, a data packet is transmitted from the EA buffer 120 to the ADSL modem 100 via multiplexer 134 at the selected ADSL transmission rate in step 184. A pause signal received from the ADSL modem indicates a buffer full or other overload condition at the receiving end of the ADSL channel (the central office in the example where the ADSL interface unit 42 is located in a home). Following receipt of a pause signal from the ADSL modem 100, data packets are not transmitted from the EA buffer 120. Transmission may be resumed upon reception of a resume signal from the ADSL modem or after a timeout period that is started when the pause signal is received from the ADSL modem. The timeout signal may be generated, for example, by a timer in controller 130. The timer is started by reception of the pause signal, and upon expiration of the timeout period, transmission of data packets to ADSL modem 100 is resumed. The resume signal and the timeout period may be used separately or in combination. In a typical configuration, the resume signal and the timeout period may both be utilized. Transmission of data packets to the ADSL modem 100 is resumed when it is determined in step 186 that the resume signal was received or the timeout period has expired. Until the resume signal is received or the timeout occurs, no data packets are transmitted.

Figure 6:
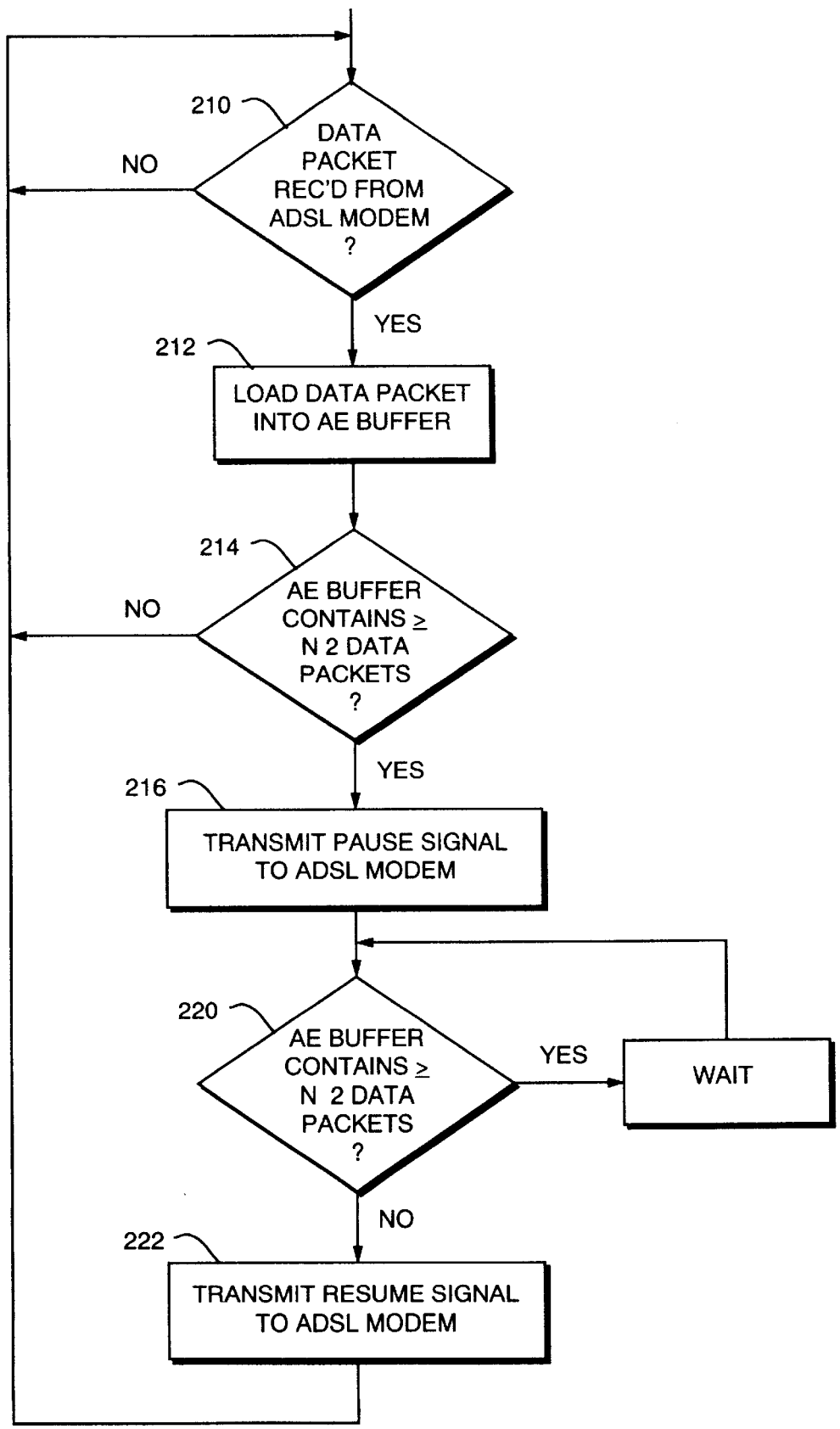
FIG. 6 is a flow diagram of the operations performed by the Ethernet to ADSL adapter in receiving data packets from the ADSL modem.

A flow diagram of the operations performed by the Ethernet to ADSL adapter 110 in receiving data packets from the ADSL modem 100 is shown in FIG. 6. When it is determined in step 210 that a data packet was received from the ADSL modem, the data packet is loaded into the AE buffer 122 in step 212. When the received data packet contains control information for the adapter 110, the control information is provided to controller 130 by control signal detector 136. The number of packets in the AE buffer 122 is monitored by the controller 130. When it is determined in step 214 that the AE buffer 122 contains less than a predetermined threshold number N2 of data packets, additional data packets may be loaded into the AE buffer 122. The threshold number N2 is selected to indicate that the AE buffer 122 is full or nearly full. When the number of data packets in the AE buffer 122 is equal to or greater than the threshold number N2, a pause signal is transmitted to the ADSL modem 100 in step 216. In particular, the controller 130 transmits a pause signal to ADSL modem 100 via multiplexer 134 and provides an appropriate select signal to multiplexer 134. The transmitting end of the ADSL channel recognizes the pause signal as a command to interrupt transmission of data packets to the ADSL interface unit 42. Transmission of data packets may be resumed by transmitting a resume signal to the transmitting end via ADSL modem 100 or upon the expiration of a timeout period at the transmitting end. The controller 130 continues to monitor the number of data packets in the AE buffer in step 220. As long as the number of data packets in the AE buffer 122 is equal to or greater than the threshold number N2, no action is taken. When sufficient data packets have been transmitted through the Ethernet port to reduce the number of data packets in the AE buffer 122 to less than the threshold number N2, a resume signal is transmitted to the ADSL modem in step 222. In particular, the controller 130 transmits a resume signal to ADSL modem 100 via multiplexer 134 and provides an appropriate select signal to multiplexer 134. Following transmission of the resume signal to the ADSL modem 100, additional data packets may be transmitted to the adapter 110 from the ADSL modem. The pause/resume signal prevents loss of data packets as a result of overloading AE buffer 122.

Figure 7:
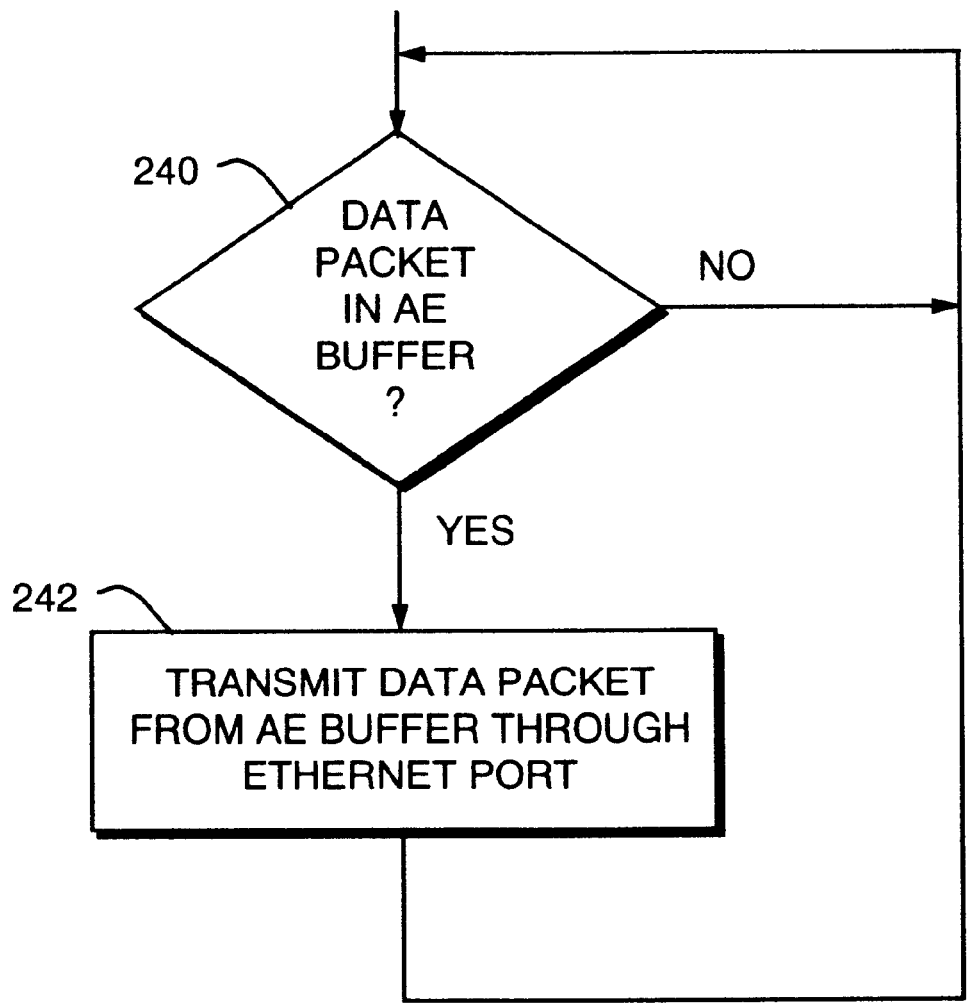
FIG. 7 is a flow diagram of the operations performed by the Ethernet to ADSL adapter in transmitting data packets to the Ethernet port.

A flow diagram of the operations performed by the Ethernet to ADSL adapter 110 in transmitting data packets through the Ethernet port 112 is shown in FIG. 7. In step 240, the controller 130 determines whether a data packet is present in the AE buffer 122. When a data packet is present, the data packet is transmitted through the Ethernet port 112 via multiplexer 132 in step 242. Standard Ethernet binary back-off is used if the buffer occupancy is below a predetermined threshold. Zero back-off is used when the buffer occupancy is above the predetermined threshold. This may be accomplished by modifying the standard Ethernet media access control (MAC) 140 (see FIG. 3) with an additional function to reset the binary back-off value.

While there have been shown and described what are at present considered the preferred embodiments of the present invention, it will be obvious to those skilled in the art that various changes and modifications may be made therein without departing from the scope of the invention as defined by the appended claims.

What is claimed is:

1. An Ethernet to ADSL adapter for controlling data communication between an Ethernet port and an ADSL modem connected to an ADSL channel, comprising:
   a first buffer for storing data packets received at the Ethernet port; and
   a controller comprising:
      a first controller portion configured to cause said data packets to be transmitted from said first buffer to the ADSL modem at a first ADSL transmission rate;
      a second controller portion configured to transmit a jamming signal from the Ethernet port when said first buffer contains a first predetermined number of data packets and data packets are not available for transmission to the Ethernet port, wherein transmission of additional data packets to the Ethernet port by other Ethernet nodes is inhibited by said jamming signal; and a third controller portion configured to cause data packets received from the ADSL modem to be transmitted to the Ethernet port at a second ADSL transmission rate.

2. An Ethernet to ADSL adapter as defined in claim 1 wherein said controller includes a fourth controller portion configured to inhibit transmission of data packets to the ADSL modem when a first pause signal is received from the ADSL modem.

3. An Ethernet to ADSL adapter as defined in claim 2 further including a timer for generating a timeout signal in response to said first pause signal, said timeout signal representing a timeout period, said controller configured to resume transmission of data packets to the ADSL modem following said timeout period.

4. An Ethernet to ADSL adapter as defined in claim 2 wherein said controller includes a fifth controller portion configured to resume transmission of data packets to the ADSL modem in response to a resume signal received from the ADSL modem following receipt of said first pause signal.

5. An Ethernet to ADSL adapter as defined in claim 4 further comprising a control signal detector for detecting said first pause signal and said resume signal in the data packets received from the ADSL modem.

6. An Ethernet to ADSL adapter for controlling data communication between an Ethernet port and an ADSL modem connected to an ADSL channel, comprising:

a first buffer for storing data packets received at the Ethernet port;

a second buffer for storing data packets received from the ADSL modem; and a controller comprising:
a first controller portion configured to cause said data packets to be transmitted from said first buffer to the ADSL modem at a first ADSL transmission rate;

a second controller portion configured to transmit a jamming signal from the Ethernet port when said first buffer contains a first predetermined number of data packets and data packets are not available for transmission to the Ethernet port, wherein transmission of additional data packets to the Ethernet port by other Ethernet nodes is inhibited by said jamming signal;

a third controller portion configured to cause data packets received from the ADSL modem to be transmitted from said second buffer to the Ethernet port at a second ADSL transmission rate;

a fourth controller portion configured to inhibit transmission of data packets to the ADSL modem when a first pause signal is received from the ADSL modem; and a fifth controller portion configured to transmit a second pause signal to the ADSL modem when said second buffer contains a second predetermined number of data packets, wherein transmission of additional data packets to the adapter from the ADSL modem is inhibited by said second pause signal.

7. An Ethernet to ADSL adapter as defined in claim 6 further including a sixth controller portion configured to transmit a resume signal to the ADSL modem following transmission of said second pause signal when said second buffer contains less than said second predetermined number of data packets.

8. An Ethernet to ADSL adapter as defined in claim 6 wherein said third controller portion is configured to transmit said data packets using binary back-off when the occupancy of said second buffer is below a threshold and to transmit said data packets using zero back-off when the occupancy of said second buffer is at or above said threshold.

9. An Ethernet to ADSL adapter for controlling data communication between an Ethernet port and an ADSL modem connected to an ADSL channel, comprising:

a first buffer for storing data packets received at the Ethernet port;

a second buffer for storing data packets received from the ADSL modem; and a controller comprising:
a first controller portion configured to cause the data packets from said second buffer to be transmitted to the Ethernet port; and a second controller portion configured to transmit a pause signal to the ADSL modem when said second buffer contains a predetermined number of data packets, wherein transmission of additional data packets to the adapter from the ADSL modem is inhibited by said pause signal.

10. An Ethernet to ADSL adapter as defined in claim 9 wherein said first controller portion is configured to transmit said data packets using binary back-off when the occupancy of said buffer is below a threshold and to transmit said data packets using zero back-off when the occupancy of said buffer is at or above said threshold.

* * * * *